(12) United States Patent
Marginet et al.

(10) Patent No.: US 11,745,574 B2
(45) Date of Patent: Sep. 5, 2023

(54) ELECTRIC VEHICLE BATTERY TRAY BRACKET

(71) Applicant: Ford Global Technologies, LLC, Dearborn, MI (US)

(72) Inventors: Rodrigo Alberto Marginet, Oakland, MI (US); James Brian Goff, Farmington Hills, MI (US); Anuj Deshpande, Farmington Hills, MI (US); Ohster Zapata, West Bloomfield, MI (US); Corey John Jarocki, Macomb, MI (US); Jeffrey A. Walesch, Canton, MI (US); Patrick W. Bain, South Lyon, MI (US); Felicia Paluzzi, Grosse Pointe, MI (US); Peter Simeon Lazarevski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 132 days.

(21) Appl. No.: 17/225,271

(22) Filed: Apr. 8, 2021

(65) Prior Publication Data

US 2022/0324312 A1 Oct. 13, 2022

(51) Int. Cl.
*B60K 1/04* (2019.01)
*B60G 21/00* (2006.01)
*B62D 21/02* (2006.01)

(52) U.S. Cl.
CPC .............. *B60K 1/04* (2013.01); *B60G 21/005* (2013.01); *B62D 21/02* (2013.01); *B60K 2001/0438* (2013.01)

(58) Field of Classification Search
CPC ......... B60K 1/04; B60G 21/005; B62D 21/02
See application file for complete search history.

(56) References Cited

U.S. PATENT DOCUMENTS

| 5,070,830 A | * | 12/1991 | Malven | B60K 17/00 123/195 A |
| 8,708,401 B2 | | 4/2014 | Lee et al. | |
| 9,937,781 B1 | * | 4/2018 | Bryer | B62D 35/02 |
| 2020/0130495 A1 | | 4/2020 | Shimizu | |

FOREIGN PATENT DOCUMENTS

CN 209126810 U 7/2019

* cited by examiner

*Primary Examiner* — John D Walters
*Assistant Examiner* — James J Triggs
(74) *Attorney, Agent, or Firm* — Lorne Forsythe; Bejin Bieneman PLC

(57) ABSTRACT

An electric vehicle includes an electric-vehicle battery tray including a frame member elongated along a vehicle-longitudinal axis. The electric vehicle includes a rocker rail elongated along the vehicle-longitudinal axis. The electric vehicle includes a subframe. The electric vehicle includes a bracket connecting the battery tray, the rocker rail, and the subframe.

19 Claims, 4 Drawing Sheets

ELECTRIC VEHICLE BATTERY TRAY BRACKET

BACKGROUND

An electric vehicle includes a battery that powers the vehicle, including propulsion of the vehicle. For example, wheels of the vehicle are powered by one or more electric motors that are powered by the battery. The battery is relatively large and heavy and, accordingly, the battery is typically packaged below the passenger compartment of the vehicle. The battery may be subject to being shorted during certain vehicle impacts if loads are applied to the battery and/or if the cooling system used to cool the battery leaks coolant on the battery.

DETAILED DESCRIPTION

Figure 1:
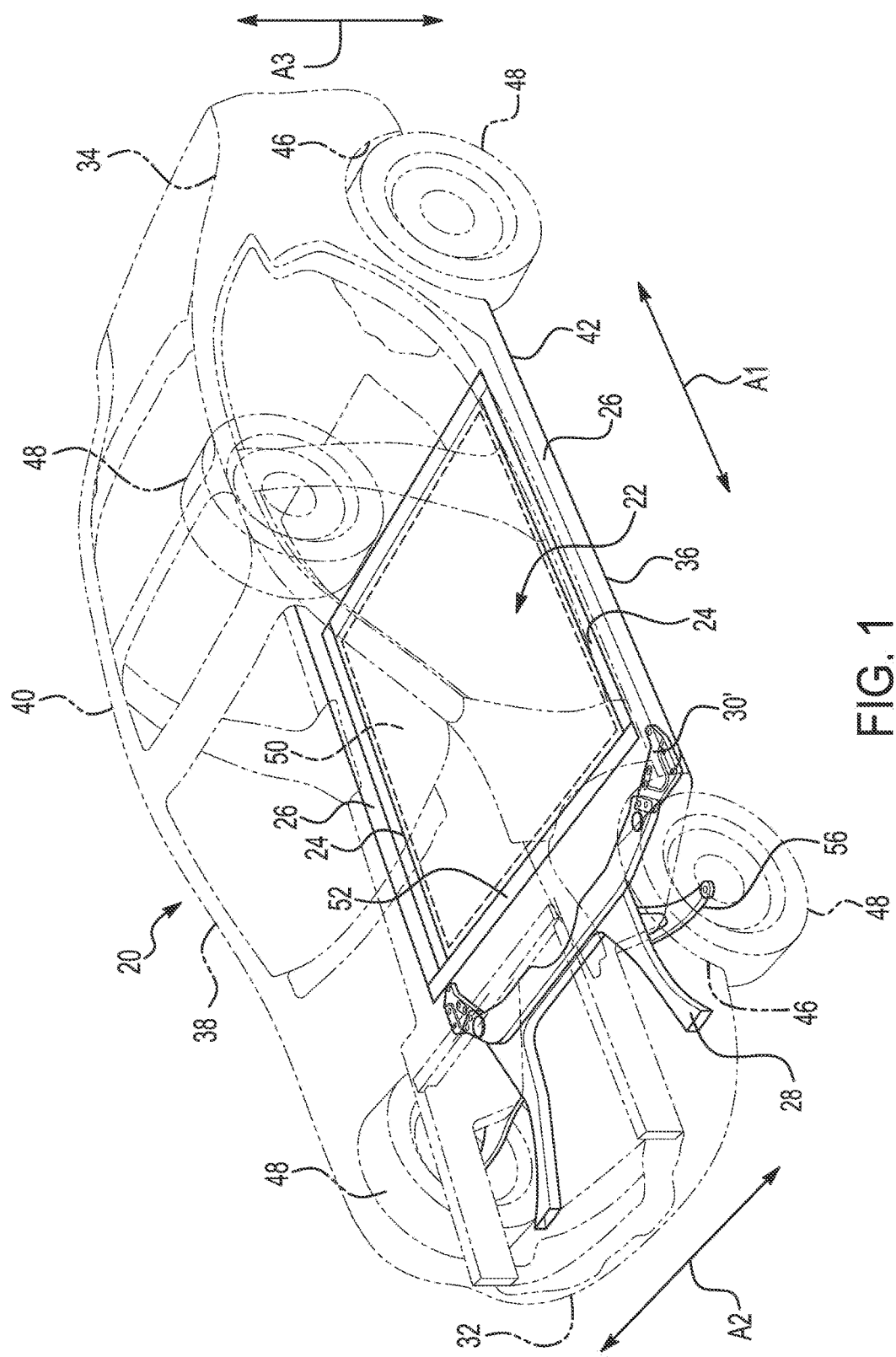
FIG. 1 is a perspective view of an electric vehicle having an electric-vehicle battery tray connected to both a rocker rail and a subframe with a bracket.

An electric vehicle includes an electric-vehicle battery tray including a frame member elongated along a vehicle-longitudinal axis. The electric vehicle includes a rocker rail elongated along the vehicle-longitudinal axis. The electric vehicle includes a subframe. The electric vehicle includes a bracket connecting the battery tray, the rocker rail, and the subframe.

The electric vehicle may include an electric-vehicle battery supported by the battery tray.

The electric vehicle may include a wheel supported by the subframe vehicle-forward of the bracket.

The wheel may define a movement path during a vehicle impact, the movement path extends reward from the wheel, and the bracket includes a front surface that extends at an obtuse angle relative to the movement path.

The movement path may be defined by movement of the wheel during a small overlap rigid barrier crash test.

The bracket may be directly in front of the frame member along the vehicle-longitudinal axis.

The battery tray may include a second frame member elongated along a vehicle-lateral axis and fixed to the bracket.

The electric vehicle may include a second rocker rail spaced from the rocker rail with the battery tray disposed between the rocker rail and the second rocker rail, and a second bracket fixed to the battery tray, the second rocker rail, and the subframe.

The bracket may be unitary.

The bracket may be designed to distribute force from the subframe to both the rocker rail and the battery tray during a vehicle front impact.

The bracket may include a plurality of ribs defining openings therebetween.

The openings each have an open top and an open bottom.

The bracket may be fixed to the subframe at first attachment point and a second attachment point, to the battery tray at a third attachment point and a fourth attachment point, and to the rocker rail at a fifth attachment point and a sixth attachment point.

The bracket may include a first rib extending from the first attachment point to the third attachment point and a second rib extending from the second attachment point to the fourth attachment point.

The bracket may include a third rib extending from the first attachment point to the fifth attachment point and a fourth rib extending from the second attachment point to the sixth attachment point.

The bracket may include a fifth rib extending from the second rib to the third rib.

The bracket may include a first sub-bracket and a second sub-bracket, both fixed to the battery tray, the rocker rail, and the subframe.

The first sub-bracket may be fixed to the second sub-bracket about a perimeter of the bracket.

The bracket may include a flange extending downward away from the battery tray.

The electric vehicle may include a control arm and a control arm bracket supported by the subframe, the control arm bracket having a second flange extending downward away from the battery tray.

With reference to the Figures, wherein like numerals indicate like parts throughout the several views, an electric vehicle 20 includes an electric-vehicle battery tray 22 that has a frame member 24 elongated along a vehicle-longitudinal axis A1. The electric vehicle 20 includes a rocker rail 26 elongated along the vehicle-longitudinal axis A1. The electric vehicle 20 includes a subframe 28. The electric vehicle 20 includes a bracket 30, 30' connecting the battery tray 22, the rocker rail 26, and the subframe 28.

The bracket 30, 30' distributes force applied to the subframe 28, e.g., during an offset front impact to the vehicle 20, to the rocker rail 26 and the frame member 24. Such force distribution may reduce deformation of the battery tray 22.

In the following description, relative orientations and directions (by way of example, top 40, bottom 42, front, rear, forward, rearward, upward, downward, outboard, inboard, inward, outward, lateral, left, right, etc.) are from the perspective of an occupant seated in a seat, facing a dashboard of the electric vehicle 20.

With reference to FIGS. 1-6, the electric vehicle 20 may be any suitable type of automobile that generates propulsion from electric power, e.g., a battery-electric vehicle (BEV), a hybrid-electric vehicle (HEV), a plug-in hybrid electric vehicle (PHEV), a passenger or commercial automobile such as a sedan, a coupe, a truck, a sport utility vehicle, a crossover vehicle, a van, a minivan, a taxi, a bus, etc. The electric vehicle 20 may be, for example, an autonomous vehicle. In other words, the electric vehicle 20 may be autonomously operated such that the electric vehicle 20 may be driven without constant attention from a driver, i.e., the electric vehicle 20 may be self-driving without human input.

The electric vehicle 20 defines the longitudinal axis A1, e.g., extending between a front 32 and a rear 34 of the electric vehicle 20. The electric vehicle 20 defines a lateral axis A2, e.g., extending between a left side 36 and a right side 38 of the electric vehicle 20. The electric vehicle 20 defines a vertical axis A3, e.g., extending between a top 40 and a bottom 42 of the electric vehicle 20. The longitudinal axis A1, the lateral axis A2, and the vertical axis A3 are perpendicular to each other.

The electric vehicle 20 includes a frame 44 that supports vehicle components and provides rigidity to the electric vehicle 20. The electric vehicle 20 may be of a unibody construction. In the unibody construction, components of the frame 44 and a body of the electric vehicle 20, e.g., rocker rails 26, a floor, a pillars, etc., serve as the frame 44. The frame 44 may be formed of any suitable material, for example, steel, aluminum, and/or fiber-reinforced plastic, etc.

The electric vehicle 20 may include wheel wells 46 that house wheels 48. The wheel wells 46 may have an arch shape that is open on an outboard side and enclosed on an inboard side. Two wheel wells 46 may be on each of the right side 38 and the left side 36 of the vehicle 20, e.g., with one at the front 32 and one at the rear 34 of each side 36, 38.

The rocker rails 26 provide rigidity at the right side 38 and the left side 36 of the electric vehicle 20 and support other vehicle components, such as doors in closed positions. The rocker rails 26 may be the lowest portion of the sides 36, 38 of the vehicle 20. The rocker rails 26 are elongated along the longitudinal axis A1. The rocker rails 26 are spaced from each other along the lateral axis A2. One rocker rail 26 may extend between the wheel wells 46 of each side 36, 38 of the vehicle 20, e.g., along the vehicle-longitudinal axis A1.

An electric-vehicle battery 50 powers propulsion of the electric vehicle 20, e.g., powers a drivetrain motor. The electric-vehicle battery 50 may be of any suitable type for vehicular electrification, for example, lithium-ion batteries, nickel-metal hydride batteries, lead-acid batteries, ultracapacitors, etc. The electric-vehicle battery 50 may include at least one battery module. Each battery module may include one or more battery cells. The electric-vehicle battery 50 may include any suitable hardware, e.g., wiring, connectors, circuits, etc., connecting the battery modules to each other and to electrified components of the electric vehicle 20.

The battery tray 22 supports the electric-vehicle battery 50 on the frame 44. For example, the battery tray 22 may include a compartment that receives the battery modules. The battery tray 22 may be disposed between the rocker rails 26 along the lateral axis A2. The battery tray 22 may be fixed to the frame 44, e.g., to the rocker rails 26, the floor, etc.

The battery tray 22 includes first frame members 24 elongated along the longitudinal axis A1. The first frame members 24 may be spaced from each other along the lateral axis A2, e.g., with the compartment therebetween. The battery tray 22 may include second frame members 52 elongated along the lateral axis A2. The second frame members 52 may be spaced from each other along the longitudinal axis A1, e.g., with the compartment therebetween. The battery tray 22 may include panels that, e.g., a bottom panel 54, a top panel (not shown in the figures that enclose the electric-vehicle battery 50. The panels may prevent intrusion of precipitation and dirt to the electric-vehicle battery 50. The top panel may separate the electric-vehicle battery 50 from components of the electric vehicle 20 above the battery tray 22, e.g., a passenger compartment. The first frame members 24, the second frame members 52, and the panels may be fixed to each other, the rocker rails 26, the floor, and/or any other suitable structure of the frame 44.

The subframe 28 supports vehicle components, e.g., steering components, suspension components, etc. The subframe 28 may include beams, panels, etc. The subframe 28 may be metal or any material of sufficient strength and rigidity. The subframe 28 is a discrete, separate structure from the frame 44. The subframe 28 is connected to the frame 44. For example, the subframe 28 may be welded to the frame 44, bolted to the frame 44, fixed to the frame 44 fastener, etc. One or more dampeners, e.g., rubber bushings, springs, etc., may be disposed between the frame 44 and the subframe 28. The subframe 28 is forward of the battery tray 22. For example, the subframe 28 may be at the front 32 of the vehicle 20.

The vehicle 20 may include control arms 56 that support the wheels 48 at the front 32 of the vehicle 20. The control arms 56 provide a hinged suspension link between the wheels 48 at the front 32 of the vehicle 20 and, for example, the subframe 28. The control arm 56 may be supported by the subframe 28, e.g., at the right side 38 and the left side 36.

As shown in FIG. 2-6, a control arm bracket 58 may be fixed to the subframe 28 at a pivot point where the control arm 56 connects to the subframe 28. The control arm bracket 58 includes a control arm flange 60 that deflects debris, e.g., gravel from a road surface, away from the battery tray 22. The control arm flange 60 extends downward away from the battery tray 22, e.g., along the vertical axis A3 to a distal edge 62. The distal edge 62 of the control arm flange 60 is lower than the battery tray 22. The control arm flange 60 may be elongated along the lateral axis A2, i.e., longer along the lateral axis A2 than along the longitudinal axis A1 and the vertical axis A3.

Figure 2:
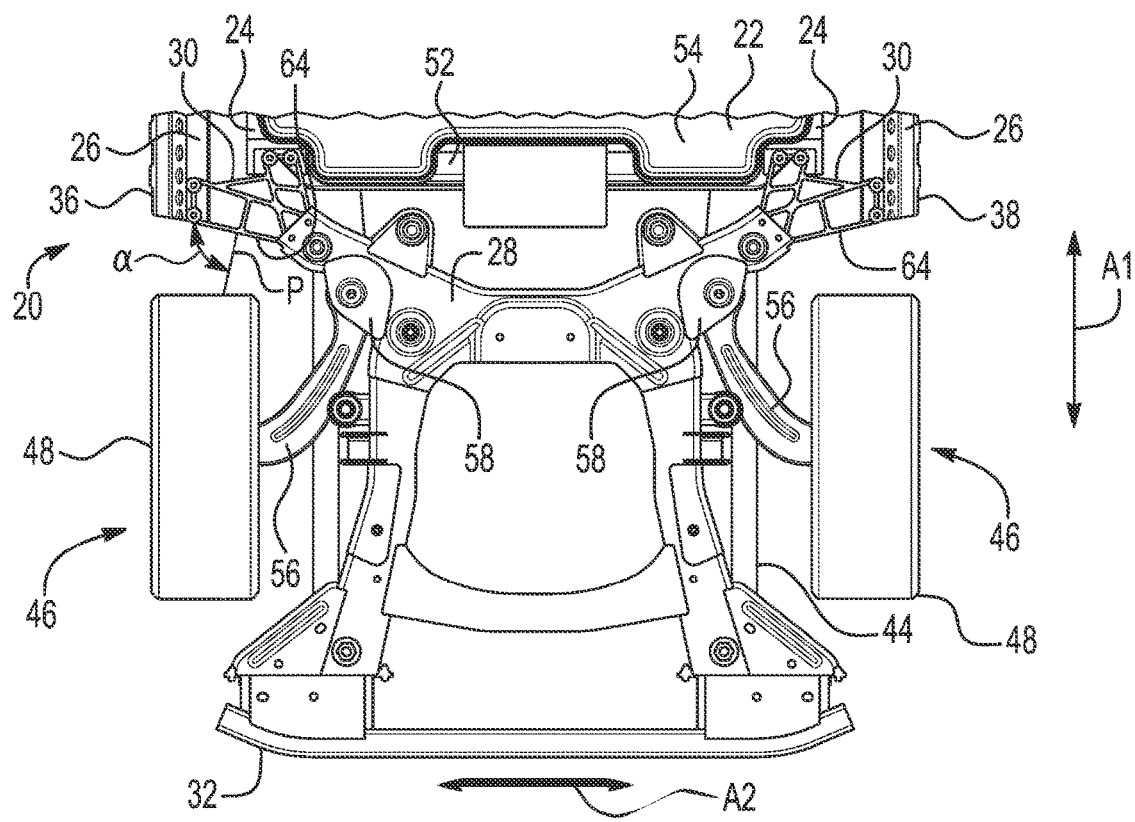
FIG. 2 is a bottom view of a portion the electric vehicle having a bracket.
Figure 4:
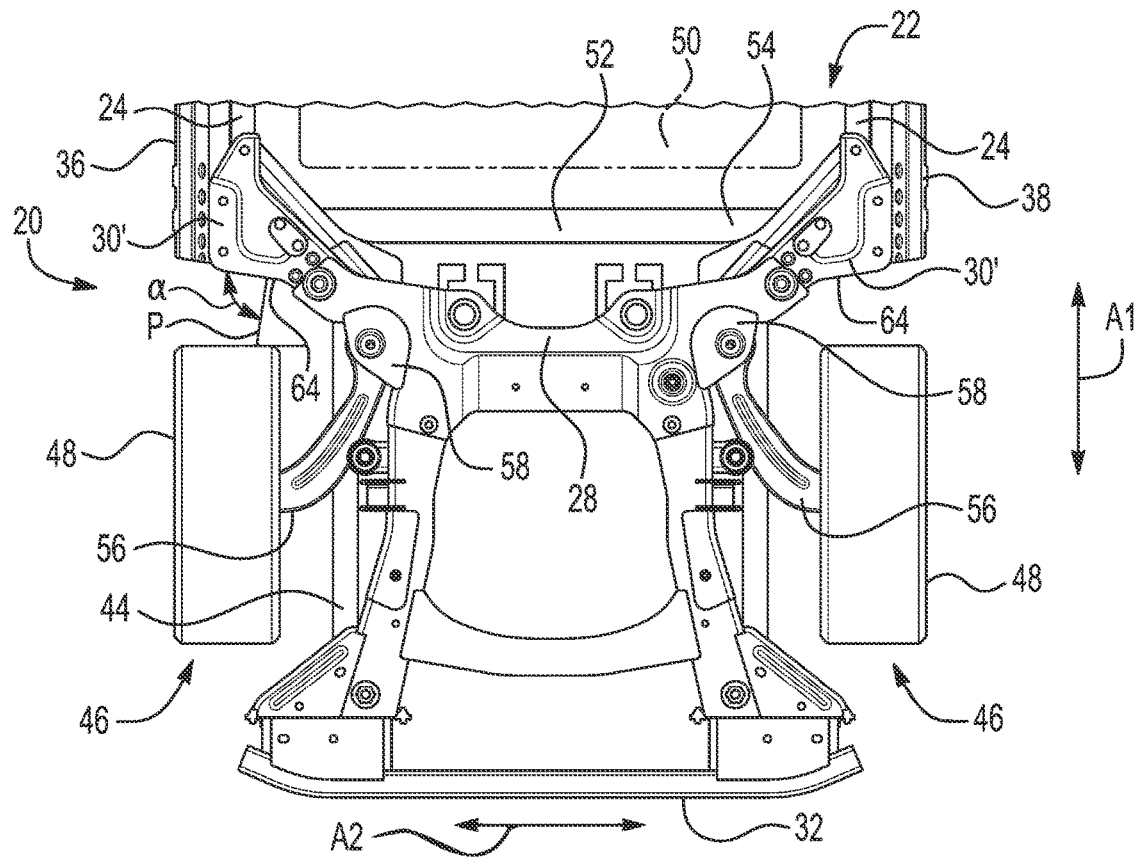
FIG. 4 is a bottom view of a portion the electric vehicle having the electric-vehicle battery tray connected to the rocker rail and the subframe with the bracket of FIG. 1.

Each of the wheels 48 at the front 32 of the vehicle 20 defines a movement path P, shown in FIGS. 2 and 4. The movement path P is a predicted trajectory of the wheel 48 during a vehicle impact to the front 32 of the vehicle 20. Deformation of, and movement interference from, certain vehicle components, e.g., the control arms 56, suspension components, and/or steering components, control movement of the wheel 48 during the vehicle impact shape the movement path P. The movement path P extends reward from the wheel 48, e.g., toward the rocker rail 26 and the battery tray 22 along the longitudinal axis A1. The movement path P may extend diagonally inward along the lateral axis A2, i.e., toward a center of the vehicle 20 along the lateral axis A2. The movement path P may be defined by movement of the wheel 48 during a small overlap rigid barrier (SORB) crash test. For example, the vehicle 20 may be subject to a SORB crash test in conformity with Insurance Institute for Highway Safety (IIHS) standards, and movement of the wheel 48 during such test may provide the movement path P.

The bracket 30, 30' is designed to distribute force from the subframe 28 to both the rocker rail 26 and the battery tray 22 during a vehicle 20 front 32 impact. For example, the vehicle 20 front 32 impact may apply force to the subframe 28. The brackets 30, 30' receive such force and direct the force to the rocker rails 26 and the battery tray 22, e.g., to the first frame members 24. The distribution of force from the subframe 28 to the rocker rails 26 and first frame members 24 reduces deformation of the compartment housing the electric-vehicle battery 50.

The brackets 30, 30' connect the battery tray 22, the subframe 28, and the rocker rails 26. One bracket 30, 30' connects, e.g., is fixed to, the battery tray 22, the subframe 28, and the rocker rail 26 at the right side 38 of the vehicle 20. Another bracket 30, 30' connects, e.g., is fixed to, the battery tray 22, the subframe 28, and the rocker rail 26 at the left side 36 of the vehicle 20. The brackets 30, 30' may be directly in front of the first frame members 24 along the longitudinal axis A1. In other words, the bracket 30, 30' may be forward of the first frame members 24 and at common positions along the lateral axis A2 as the first frame members 24. One bracket 30, 30' may be directly in front 32 of the first frame member 24 at the right side 38 and another bracket 30, 30' may be directly in front 32 of the first frame member 24 at the left side 36.

The bracket 30, 30' may be designed to inhibit the wheels 48 at the front 32 of the vehicle 20 from embedding into the wheel wells 46, e.g., during a SORB crash test. The bracket 30, 30' may include a front surface 64 designed to urge the wheel 48 traveling long the movement path P outward from the wheel well 46. The front surface 64 extends at an obtuse angle α relative to the movement path P, as shown in FIGS. 2 and 4. The obtuse angle α is measured outboard of the movement path P and in a plane extending along the longitudinal axis A1 and the lateral axis A2. In other words, the front surface 64 may define a normal vector that is transverse to, and extends outboard of, the movement path P.

The bracket 30, 30' may be unitary, i.e., a single component that is not disassemble into smaller separate components with destructive processes. For example, the bracket 30 may be monolithic, i.e., a single, uniform piece of material with no seams, joints, fasteners, or adhesives and/or formed together simultaneously as a single continuous unit, e.g., by machining from a common blank, molding, forging, casting, 3-D printing, etc. As another example, the bracket 30' may include component that are permanently fused together, e.g., via welding or the like. Non-unitary components, in contrast, are formed separately and subsequently assembled, e.g., by threaded engagement, fastener, etc. Non-unitary components may be disassembly without destructive processes, e.g., via unthreading a fastener.

The wheels 48 at the front 32 of the vehicle 20 are supported by the subframe 28 forward of the respective brackets 30, 30' at the right side 38 and the left side 36, e.g., via the control arms 56 and/or other structure. During an impact to the front 32 of the vehicle 20, e.g., a SORB crash test, crash forces may urge the wheel 48 at the right side 38 or the left side 36 along the movement path P toward the bracket 30, 30'. Normal forces between the front surface 64 of the bracket 30, 30' and the wheel 48 may urge the wheel 48 outboard of the vehicle 20 and away from the wheel well 46, e.g., inhibiting the wheel 48 at the front 32 of the vehicle 20 from embedding into the wheel well 46.

Figure 3:
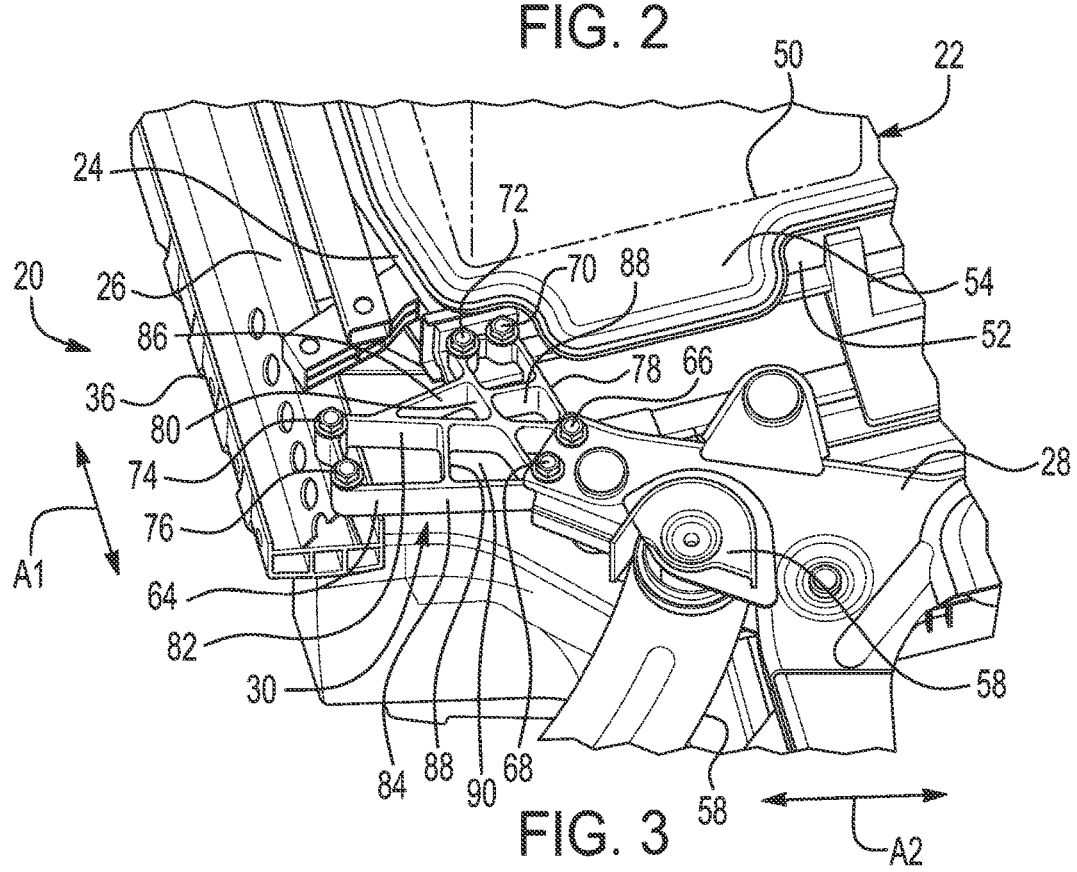
FIG. 3 is a bottom perspective view of a portion the electric vehicle having the bracket of FIG. 2.

With reference to FIG. 3, the brackets 30 may be fixed to the subframe 28 at first attachment point 66 and a second attachment point 68, to the battery tray 22 at a third attachment point 70 and a fourth attachment point 72, and to the respective rocker rail 26 at a fifth attachment point 74 and a sixth attachment point 76. For example, a bolt or other suitable fastener may fix the brackets 30, 30' to the subframe 28, rocker rails 26, and battery tray 22 at each of the attachment points 66, 68, 70, 72, 74, 76.

Each of the brackets 30 may include a first rib 78 extending from the first attachment point 66 to the third attachment point 70 and a second rib 80 extending from the second attachment point 68 to the fourth attachment point 72. The first rib 78 and the second rib 80 distribute force from the subframe 28 to the battery tray 22.

Each of the brackets 30 may include a third rib 82 extending from the first attachment point 66 to the fifth attachment point 74 and a fourth rib 84 extending from the second attachment point 68 to the sixth attachment point 76. The third rib 82 and the fourth rib 84 distribute force from the subframe 28 to the respective rocker rail 26.

Each bracket 30 may include a fifth rib 86 extending from the second rib 80 to the third rib 82. The fifth rib 86 reinforces, and distributes force between, the second rib 80 and the third rib 82.

Each bracket 30 may include a plurality of cross ribs 88 extending between the first rib 78 and the second rib 80 and between the third rib 82 and the fourth rib 84. The cross ribs 88 reinforce, and distribute force between, the first rib 78 and the second rib 80, and the third rib 82 and the fourth rib 84.

The ribs 78, 80, 82, 84, 86, 88 define openings 90 therebetween. The openings 90 may each have an open top and an open bottom. In other words, the openings 90 may extend completely through the bracket 30, 30' along the vertical axis A3.

The bracket 30 may be monolithic, e.g., the ribs 78, 80, 82, 84, 86, 88 may be a single, uniform piece of material with no seams, joints, fasteners, or adhesives and/or formed together simultaneously as a single continuous unit.

Figure 6:
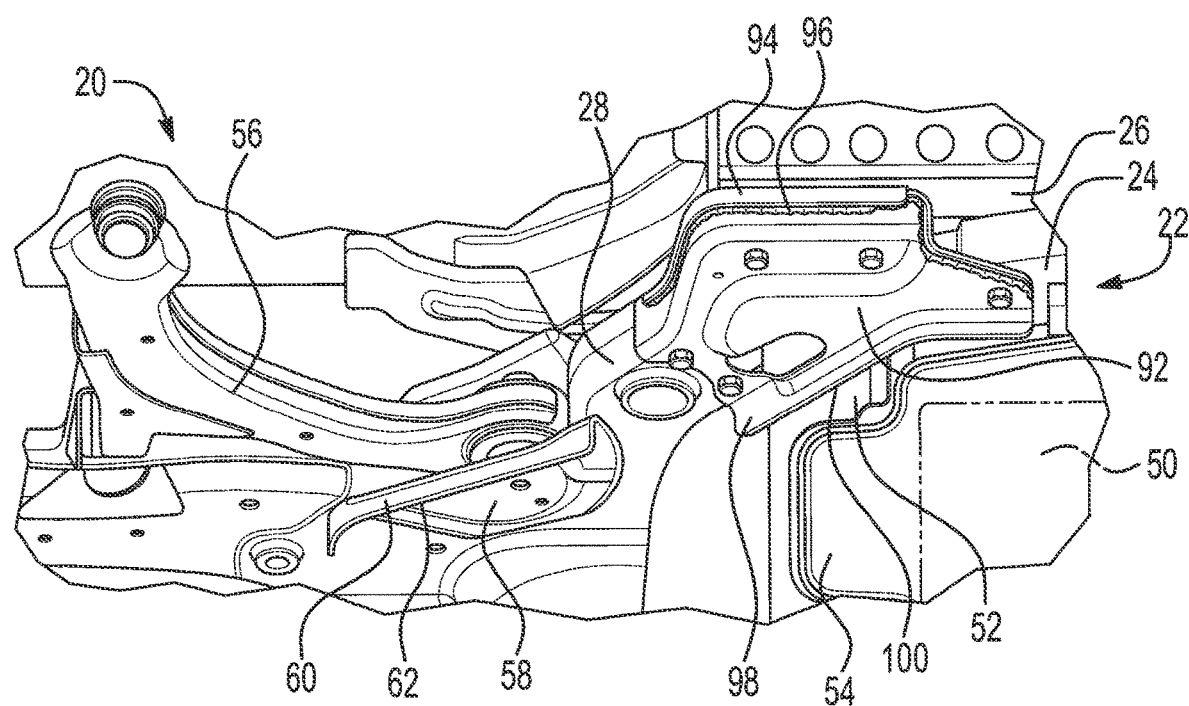
FIG. 6 is a bottom perspective view of a portion the electric vehicle having the bracket of FIG. 1.

With reference to FIG. 6, each of the brackets 30' may include a first sub-bracket 92 and a second sub-bracket 94, both fixed to the battery tray 22, the respective rocker rail 26, and the subframe 28. For example, the first sub-bracket 92 of the bracket 30' on the right side 38 is fixed to the battery tray 22, the rocker rail 26 on the right side 38, and the subframe 28, and the second sub-bracket 94 of the bracket 30' on the right side 38 is fixed to the battery tray 22, the rocker rail 26 on the right side 38, and the subframe 28. The first sub-bracket 92 and the second sub-bracket 94 of each bracket 30' may be fixed to the battery tray 22, the respective rocker rail 26, and the subframe 28 with common fasteners. For example, a bolt may extend though both the first sub-bracket 92 and the second sub-bracket 94 to fix the bracket 30' to the subframe 28, or other component. The first sub-bracket 92 and the second sub-bracket 94 may be stacked on top 40 of each other, e.g., with the second sub-bracket 94 above the first sub-bracket 92 and between the subframe 28 and the first sub-bracket 92. The first sub-bracket 92 may be fixed to the second sub-bracket 94 about a perimeter of the bracket 30'. For example, a weld 96 may fix the first sub-bracket 92 to the second sub-bracket 94, surrounding an outer surface of the first sub-bracket 92 and the second sub-bracket 94. The weld 96 may extend along the longitudinal axis A1 and the lateral axis A2.

Figure 5:
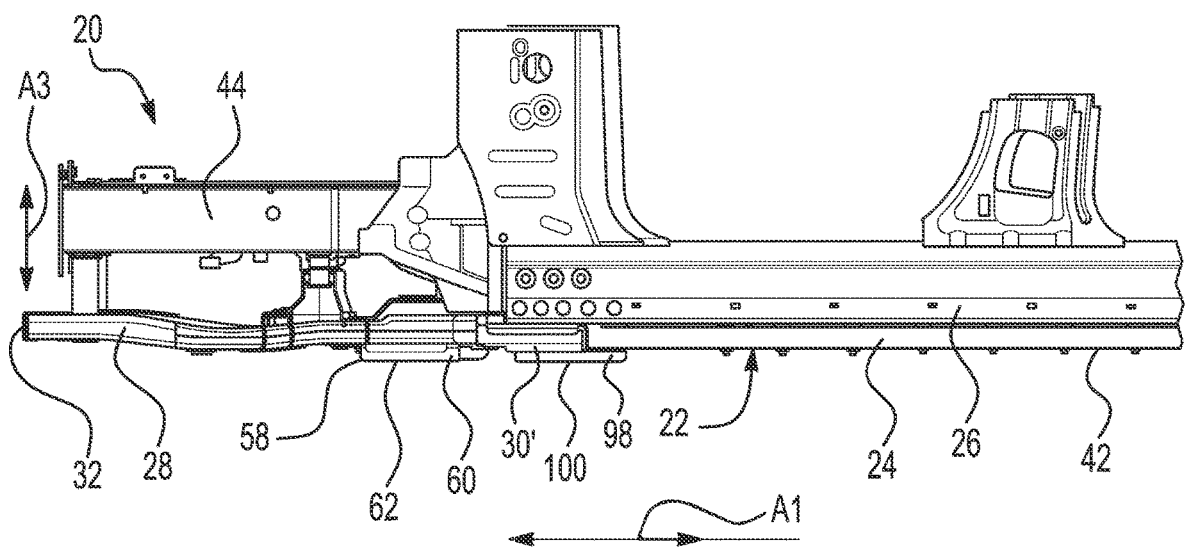
FIG. 5 is a side view of a portion the electric vehicle having the bracket of FIG. 1.

With reference to FIGS. 5 and 6, the brackets 30' may include a flange 98 that deflects debris, e.g., gravel from a road surface, away from the battery tray 22. For example, the first sub-bracket 92 may include the flange 98 The flange 98 extends downward away from the battery tray 22, e.g., along the vertical axis A3 to a distal edge 100. The distal edge 100 of the flange 98 is lower than the battery tray 22. The flange 98 may be elongated along the lateral axis A2.

The adjectives "first," "second," etc., are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. An electric vehicle, comprising:
an electric-vehicle battery tray including a frame member elongated along a vehicle-longitudinal axis;
a rocker rail elongated along the vehicle-longitudinal axis;
a subframe; and
a bracket fixed to the battery tray, the rocker rail, and the subframe.

2. The electric vehicle of claim 1, further comprising an electric-vehicle battery supported by the battery tray.

3. The electric vehicle of claim 1, further comprising a wheel supported by the subframe vehicle-forward of the bracket, and wherein the wheel defines a movement path during a vehicle impact, the movement path extends rearward from the wheel, and the bracket includes a front surface in the movement path, the front surface extending at an obtuse angle relative to the movement path as measured vehicle-outboard of the movement path and forward of the bracket.

4. The electric vehicle of claim 1, wherein the bracket is directly in front of the frame member along the vehicle-longitudinal axis.

5. The electric vehicle of claim 1, wherein the battery tray includes a second frame member elongated along a vehicle-lateral axis and fixed to the bracket.

6. The electric vehicle of claim 1, further comprising a second rocker rail spaced from the rocker rail with the battery tray disposed between the rocker rail and the second rocker rail, and a second bracket fixed to the battery tray, the second rocker rail, and the subframe.

7. The electric vehicle of claim 1, wherein the bracket is unitary.

8. The electric vehicle of claim 1, wherein the bracket distributes force from the subframe to both the rocker rail and the battery tray during a vehicle front impact.

9. The electric vehicle of claim 1, wherein the bracket includes a plurality of ribs defining openings therebetween.

10. The electric vehicle of claim 9, wherein the openings each have an open top and an open bottom.

11. The electric vehicle of claim 1, wherein the bracket is fixed to the subframe at first attachment point and a second attachment point, to the battery tray at a third attachment point and a fourth attachment point, and to the rocker rail at a fifth attachment point and a sixth attachment point.

12. The electric vehicle of claim 11, wherein the bracket includes a first rib extending from the first attachment point to the third attachment point and a second rib extending from the second attachment point to the fourth attachment point.

13. The electric vehicle of claim 12, wherein the bracket includes a third rib extending from the first attachment point to the fifth attachment point and a fourth rib extending from the second attachment point to the sixth attachment point.

14. The electric vehicle of claim 13, wherein the bracket includes a fifth rib extending from the second rib to the third rib.

15. An electric vehicle, comprising:
an electric-vehicle battery tray including a frame member elongated along a vehicle-longitudinal axis;
a rocker rail elongated along the vehicle-longitudinal axis;
a subframe; and
a bracket connecting the battery tray, the rocker rail, and the subframe, the bracket including a first sub-bracket and a second sub-bracket, both fixed to the battery tray, the rocker rail, and the subframe.

16. The electric vehicle of claim 1, wherein the bracket includes a flange extending downward away from the battery tray.

17. The electric vehicle of claim 16, further comprising a control arm and a control arm bracket supported by the subframe, the control arm bracket having a second flange extending downward away from the battery tray.

18. The electric vehicle of claim 15, wherein the first sub-bracket is fixed to the second sub-bracket about a perimeter of the bracket.

19. An electric vehicle, comprising:
an electric-vehicle battery tray including a frame member elongated along a vehicle-longitudinal axis;
a rocker rail elongated along the vehicle-longitudinal axis;
a subframe;
a bracket connecting the battery tray, the rocker rail, and the subframe; and
a wheel supported by the subframe vehicle-forward of the bracket, the wheel defines a movement path during a vehicle impact, the movement path extends rearward from the wheel; and
the bracket includes a front surface in the movement path, the front surface extending at an obtuse angle relative to the movement path as measured vehicle-outboard of the movement path and forward of the bracket.

* * * * *